United States Patent [19]

Zakai

[11] Patent Number: 4,824,072
[45] Date of Patent: Apr. 25, 1989

[54] TUBE-DIAPHRAGM VALVE
[75] Inventor: Avi Zakai, Rishon Le-Zion, Israel
[73] Assignee: Mil Mutzarim Techniim (1971) B.M., Holon, Israel
[21] Appl. No.: 78,003
[22] Filed: Jul. 21, 1987

Related U.S. Application Data

[63] Continuation-in-part of Ser. No. 550,039, Nov. 8, 1983, abandoned, which is a continuation-in-part of Ser. No. 363,822, Mar. 31, 1982.

[51] Int. Cl.$^4$ .............................................. F16L 55/14
[52] U.S. Cl. ................................. 251/005; 251/61.1
[58] Field of Search ..................... 251/5, 61.1, 331; 137/513.5, 496, 493, 843, 844

[56] References Cited

U.S. PATENT DOCUMENTS

| | | | |
|---|---|---|---|
| 3,039,733 | 6/1962 | Mattioli | 251/5 |
| 3,325,138 | 6/1967 | Connolly | 251/5 |
| 3,338,310 | 8/1967 | McGill | 251/5 |
| 3,441,245 | 4/1969 | Holland et al. | 251/5 |
| 3,836,113 | 9/1974 | Johnson | 251/61.1 |
| 3,838,704 | 10/1974 | Johnson | 251/5 |
| 3,942,756 | 3/1976 | Brumm et al. | 251/61.1 |
| 4,050,669 | 9/1977 | Brumm | 251/61.1 |
| 4,056,965 | 11/1977 | Heiser | 251/5 |
| 4,132,382 | 1/1979 | Jackson | 251/5 |
| 4,395,016 | 7/1983 | Welker | 251/5 |

Primary Examiner—Larry Jones
Attorney, Agent, or Firm—Browdy & Neimark

[57] ABSTRACT

There is disclosed a tub diaphragm valve for controlling hydraulic flow therethrough. The valve includes a diaphragm composed of innermost and outermost layers formed of elastic resiliently distortable fluid tight material and an intermediate layer of mesh material of relatively limited stretchability being unbonded to the innermost and outermost layers.

4 Claims, 4 Drawing Sheets

TUBE-DIAPHRAGM VALVE

CROSS-REFERENCE TO OTHER APPLICATIONS

This application is a continuation-in-part application of co-pending application Ser. No. 550,039 filed on Nov. 8, 1983, now abandoned, itself a continuation-in-part of application Ser. No. 363,822, filed Mar. 31, 1982.

BACKGROUND OF THE INVENTION

1. Field of the Invention

This invention relates to tube-diaphragm valves.

2. Description of the Prior Art

Tube-diaphragm valves have long been known and attempts are continuously made to improve their operation.

In one such valve, as for example described in U.S. Pat. No. 4,451,023 (Zakai) a cylindrical valve casing is formed with a pair of end flanges for coupling to inlet and outlet pipes. Located within the casing and directed transverse to the longitudinal axis thereof is an impervious disc like barrier which is supported within the casing by a pervious cage structure which extends on either side of the barrier to respective end portions of the casing. A flexible tubular diaphragm is located coaxially within the casing, is secured at its end portions to respective end portions of the casing so as normally to be stretched over and in contact with the periphery of the barrier, the tubular diaphragm defining with the inner casing surface a control chamber which is adapted to communicate with an outside pressure source via an aperture formed in the casing. In operation, flow takes place through the valve from the inlet to the outlet pipes through the cage structure (formed as a narrow spaced apart array of fingers) and around the impervious barrier as a result of the outward displacement of the tubular diaphragm under the water flow pressure. When this flow is to be interrupted the control chamber is coupled, via the aperture in the casing, to a hydraulic pressure source and, as a consequence, the tubular diaphragm sealingly presses against the barrier periphery cutting off the flow.

With valves of this type the tubular diaphragm is sometimes subjected to excessive control pressure when the valve is in the closed state. This is because when the valve is in the closed state, the downstream pressure in the fluid flow system, in which the valve is coupled, is low as compared with the control pressure in the valve control chamber, and the diaphragm may be stretched excessively in its downstream portion. It is for this reason that the prior art tube-diaphragm valve such as that of Zakai employs a cage-like structure in which the narrowly spaced apart array of fingers is used to support the diaphragm and prevent it from stretching. The array of fingers must be sufficiently strong to withstand the control pressure under the maximum pressure conditions outlined, and yet the array must be constructed with sufficient space between its individual fingers to allow large volume flows sometimes containing solid matter to pass unobstructed. This complicates the design and manufacturing of the cage-like support structure of prior art tube-diaphragm valves.

Repeated forced displacement of the diaphragm towards and away from the central barrier and fingers of the cage-like structure often results in the diaphragm becoming torn and the consequent eventual rendering of the valve unusable.

This vulnerability of the diaphragm to rupture or tearing reduces the pressure ranges within which the valve can be expected to operate effectively.

One way of increasing the operative pressure range of this type of valve is by vulcanizing a cord or a mesh material into the resilient diaphragm material. However, by so doing the resiliency of the diaphragm material is substantially reduced. It has been proposed to overcome this lack of diaphragm resiliency (as for example in U.S. Pat. No. 2,633,154) by using resilient valve housing walls. This proposal has however various inherent drawbacks in connection with the valve housing construction.

BRIEF DESCRIPTION OF THE INVENTION

According to one aspect of the present invention there is provided a tube diaphragm valve for controlling hydraulic flow therethrough, said valve comprising:

valve casing means, inlet and outlet port means spaced apart in said casing means along a longitudinal axis, definable as a first axis, a hollow support structure mounted within said casing means and having pervious walls extending between said port means, an impervious stationary disc like barrier transversing said structure along said first axis and positioned to cause hydraulic fluid to flow through said pervious walls and around said barrier, a resilient tubular diaphragm surrounding said structure secured at its ends to said casing means and extending substantially from port to port, said diaphragm having a valve closed position when abutting said barrier thereby preventing flow around said barrier and a valve opened position remote from said barrier thereby enabling flow around said barrier, said casing and diaphragm defining a control chamber, aperture means in said casing to enable varying the pressure in said control chamber to move said diaphragm between said valve closed position and said valve opened position, said diaphragm comprising innermost and outermost layers formed of substantially elastic, resiliently distortable fluid tight material and an intermediate layer of mesh material of relatively limited stretchability being unbonded to the innermost and outermost layers and being free to independently stretch to its limit, without affecting the flexibility of the innermost and outermost layers, said innermost layer being normally stretched so as to abut said barrier.

Thus the tubular diaphragm essentially comprises two layers of impermeable, resiliently distortable (elastic) material, for example rubber, between which is interposed a layer of mesh material, e.g. cloth. The mesh material is free to extend up to its dimensional limits, and thereafter withstand substantial pressure stresses and strains without tearing. The diaphragm is secured at opposite ends within the hollow casing, typically cylindrical, which is connected in a fluid flow path. One of the elastic layers, hereinafter referred to as the inner layer, is exposed to the fluid flow, thus defining the inner surface of the diaphragm while the other elastic layer, hereafter referred to as the outer layer, is closest to the inner surface of the casing and defines the outer surface of the diaphragm. The mesh layer between the inner and outer layers is free to extend within its dimensional limits or contract or fold up between the two elastic layers. The tubular diaphragm can therefore be considered as comprising three flexible concentric hollow cylinders with the intermediate cylinder of a mesh material limiting the degree of expansion of the inner elastic cylinder as a consequence of the pressures to which it is subjected, thereby reducing the dangers of tearing without at the same time reducing the resiliency thereof.

One embodiment of a tube diaphragm valve in accordance with the invention will now be described by way of example and with reference to the accompanying drawings.

DETAILED DESCRIPTION OF THE PREFERRED EMBODIMENTS

Figure 1A:
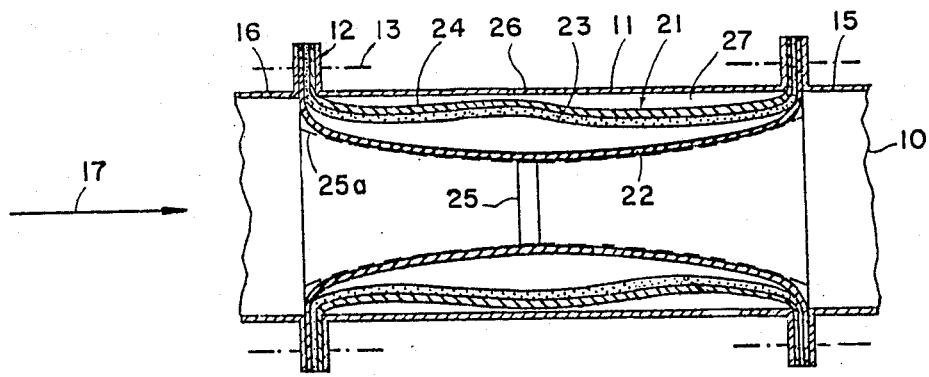
FIGS. 1a, 1b and 1c are schematic representations of a tubular diaphragm valve in accordance with the invention in differing stages of operation.
Figure 1B:
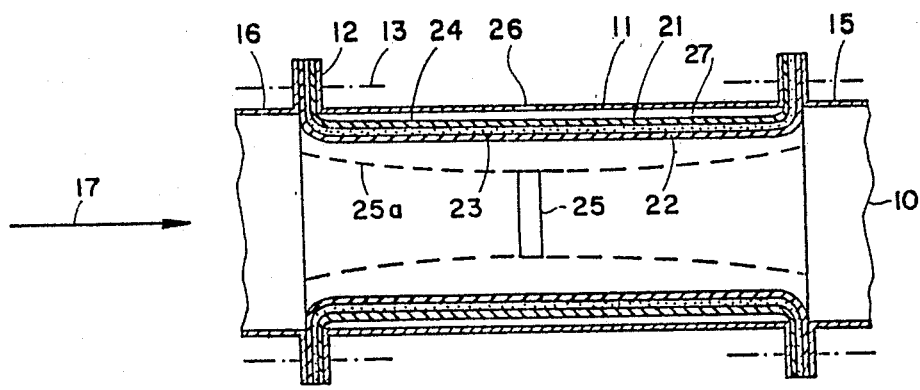
Figure 1C:
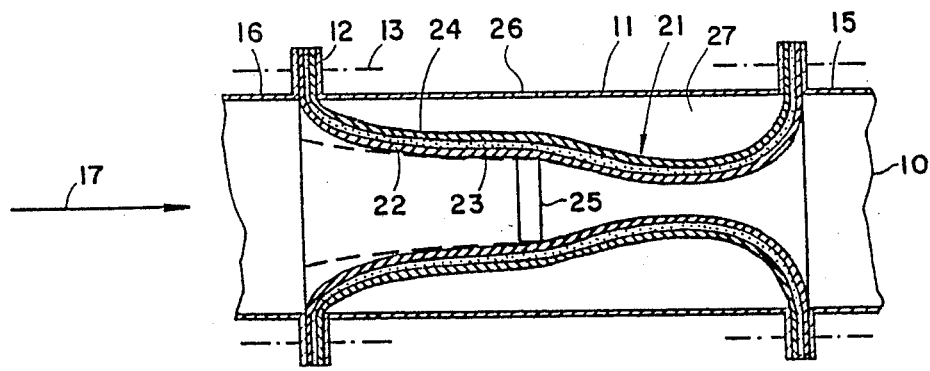

Reference will first be made to FIGS. 1a, 1b and 1c of the drawings which show schematical cross-sectional views of an embodiment of a valve connected in a fluid flow line 10 in respectively differing stages of operation, i.e. FIG. 1a shows the valves when there is no flow in the flow line; FIG. 1b shows the valve in an open condition and FIG. 1c shows the valve in a closed condition. This embodiment of the valve was described in the parent application Ser. No. 550,039 filed on Nov. 8, 1983, the present application being a continuation-in-part of said parent application, FIG. 1c herein being substantially similar to FIG. 6 in the parent application showing the valve in the closed condition.

The valve is shown as consisting of an axial casing 11 with end flanges 12 extending outwardly therefrom. Appropriate means, such as bolts 13 are used to secure the casing 11 to inlet and outlet pipes 15 and 16. The flow direction is indicated by arrow 17.

Within the casing 11 there is located a novel tubular diaphragm 21 consisting of an inner tubular layer 22, an intermediary tubular layer 23 and an outer tubular layer 24. Both layers 22 and 24 are made of a resiliently distortable, elastic material, e.g. rubber. These layers are separately vulcanized. The intermediary layer 23 consists of a layer made of a flexible mesh material, e.g. cloth. It is not bonded to either of layers 22 and 24 on either side of it. Rather it is free to expand or stretch up to a certain limit as will be described, as well as contract between layers 22 and 24. It is the ability of cloth layer 23 to stretch freely between layers 22 and 24 to a certain limit that provides the present invention with its advantages. The diaphragm 21 is secured at its ends to the end flanges 12 of the casing 11.

A central impervious disc like barrier 25 is located centrally within the casing being supported by a support structure 25a to be described with reference to FIGS. 2. As will be explained with reference to FIG. 2, the external diameter of the barrier 25 is greater than the unstretched diameter of the inner tubular layer 22 so that in the normal state of the valve the inner layer 22 bears sealingly against the rim of the barrier 25.

The casing 11 is formed with an aperture 26 through which hydraulic pressure can be applied to a control chamber 27 defined between the inner wall of the casing 11 and the outer surface of the layer 24.

The operation of the valve 10 when connected in a fluid flow line including the pipes 15 and 16 is as follows. When there is no flow in the flow line (as shown in FIG. 1a) the inner layer 22 bears sealingly against the rim of the barrier 25. When flow starts in the flow line, the fluid flow pressure presses the inner layer 22 together with the entire diaphragm 21 away from the rim of the barrier 25, thereby opening the valve to throughflow as shown in FIG. 1b. When it is desired to close the valve to throughflow a hydraulic pressure is applied to the control chamber 27 via the aperture 26 and this pressure together with the inwardly directed biassing pressure on the inner layer 22 pushes the latter into sealing engagement with the rim of the barrier 25 thereby closing the valve as shown in FIG. 1c. By virtue of the provision of the intermediate mesh layer 23 and the fact that the latter is only capable of limited extension the diaphragm 21 as a whole is only subjected to limited stretching under the maximum pressure differential obtaining at the downstream end of the valve as seen in FIG. 1c of the drawings.

Reference will now be made to FIGS. 2 of the drawings for a detailed illustration of a tube diaphragm valve in accordance with the invention as shown schematically in FIGS. 1.

The valve structure is of the general kind disclosed in U.S. Pat. No. 4,451,023 (Zakai) and comprises a casing 31, a pervious cage-like support structure 32 located within the casing 31 having a central impervious disc like barrier 33 with a stepped peripheral rim 34, the barrier 33 being secured to the structure 32 by a throughgoing bolt 35. A tubular diaphragm 36 consists of a inner tubular rubber layer 37, an outer tubular rubber layer 38 and an intermediate mesh layer 39. The constituent layers 37, 38 and 39 of the diaphragm 36 are clamped at their edge portions between the contiguous edges of the casing 31 and the support structure 32. The valve is clamped by bolts 40 between inlet and outlet pipes 15 and 16 respectively provided with flanges 15a and 16a. The casing 31 is provided with an inlet port 42 through which hydraulic pressure can be introduced into a control chamber 43 defined between the casing 31 and the outer layer 38.

The support structure 32 comprises a plurality of radially spaced apart limbs 43a (as compared with the closely spaced fingers shown by Zakai) which extend from opposite surfaces of the barrier 33 and terminate in integrally formed annular end pieces 43a secured to the casing 31.

Figure 2A:
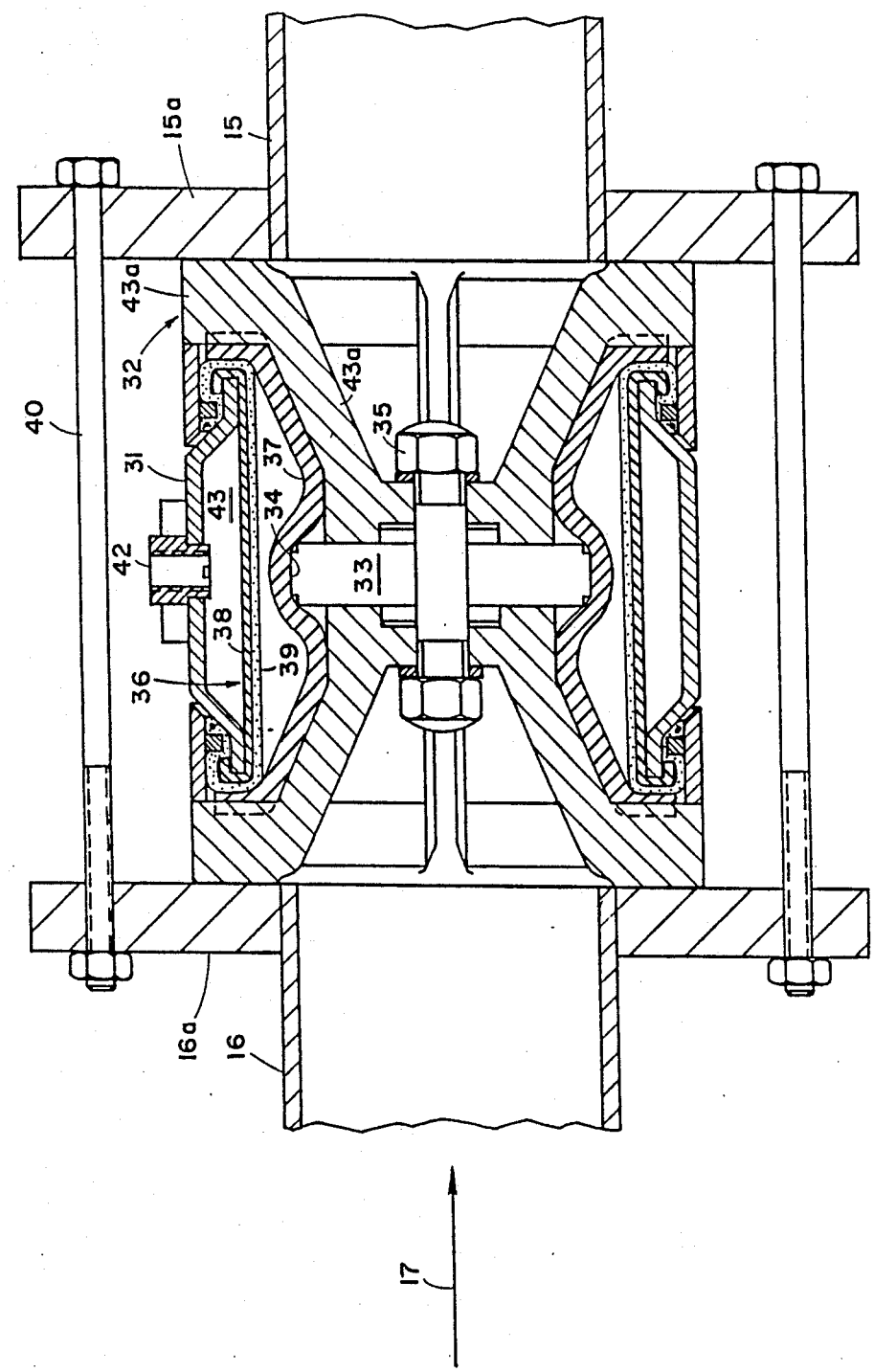
FIGS. 2a, 2b and 2c are cross-sectional views of a tubular diaphragm valve in accordance with the invention in differing stages of operation corresponding respectively to the stages shown in FIGS. 1a, 1b and 1c.

As can be clearly seen in FIG. 2a of the drawings, in the assembled valve the diaphragm surrounds the support structure limbs 43a and barrier 33 such that the inner rubber layer 37 bears sealingly against the rim 34 of the barrier 33. As previously described with reference to FIG. 1b and 1c of the drawings, water throughflow in the valve is represented by FIG. 2b and the closure of the valve by the introduction of hydraulic pressure into the control chamber 43 is shown in FIG. 2c.

As shown in FIG. 2a, the inner rubber layer 37 abuts the central barrier 33. It does so even when the valve is non-operational and there is no control pressure in the control chamber 43, because it is originally molded to provide a normally closed (NC) operation and its normal diameter is less than that of the barrier 33. However, the mesh cloth layer 39 and the outer layer 38 maintain their original shape even when no control pressure is applied.

Figure 2B:
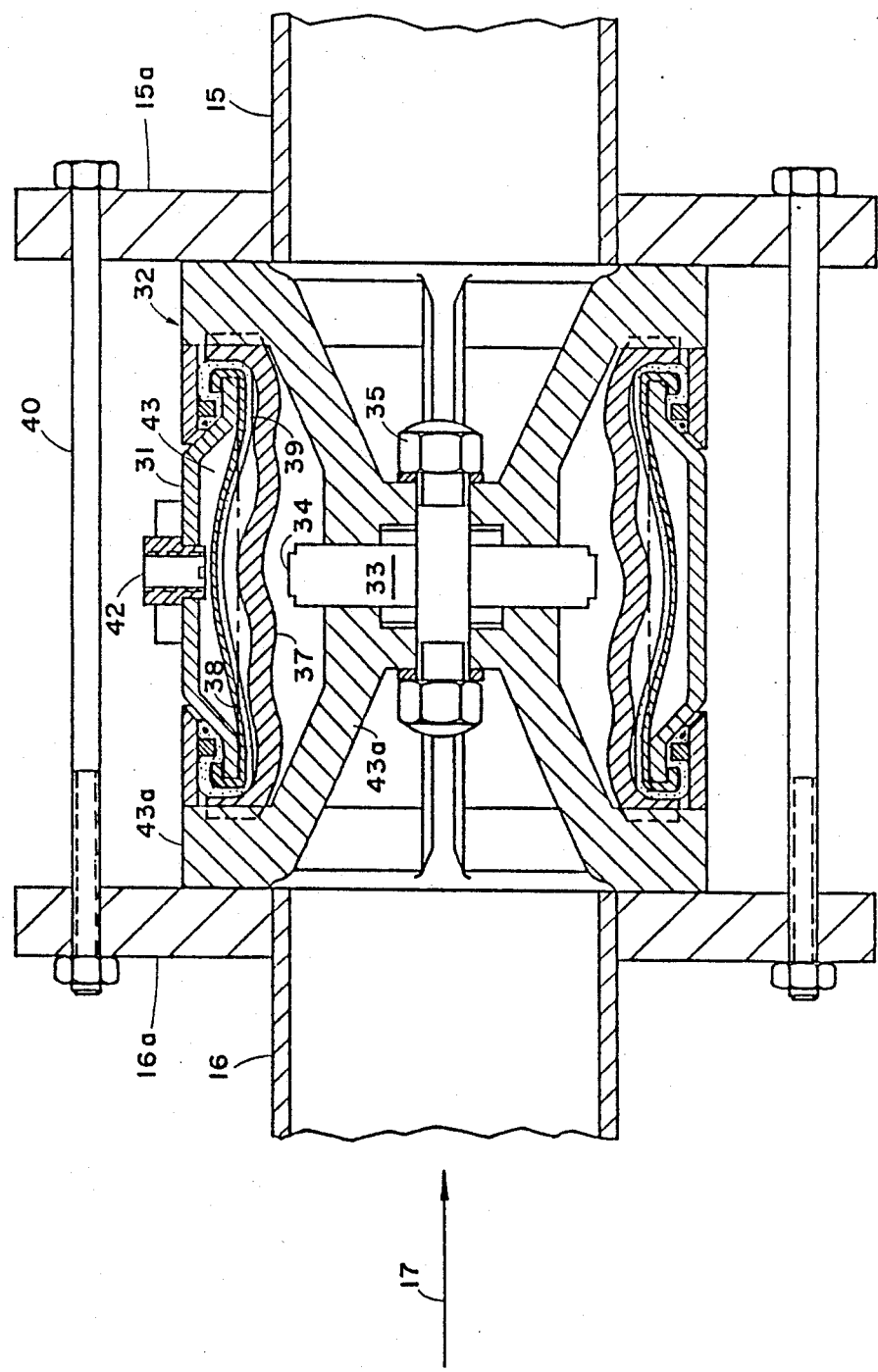

As seen in FIG. 2b of the drawings, upon throughflow the water pressure displaces the inner layer 37 away from the barrier 33 so as to open the valve.

Figure 2C:
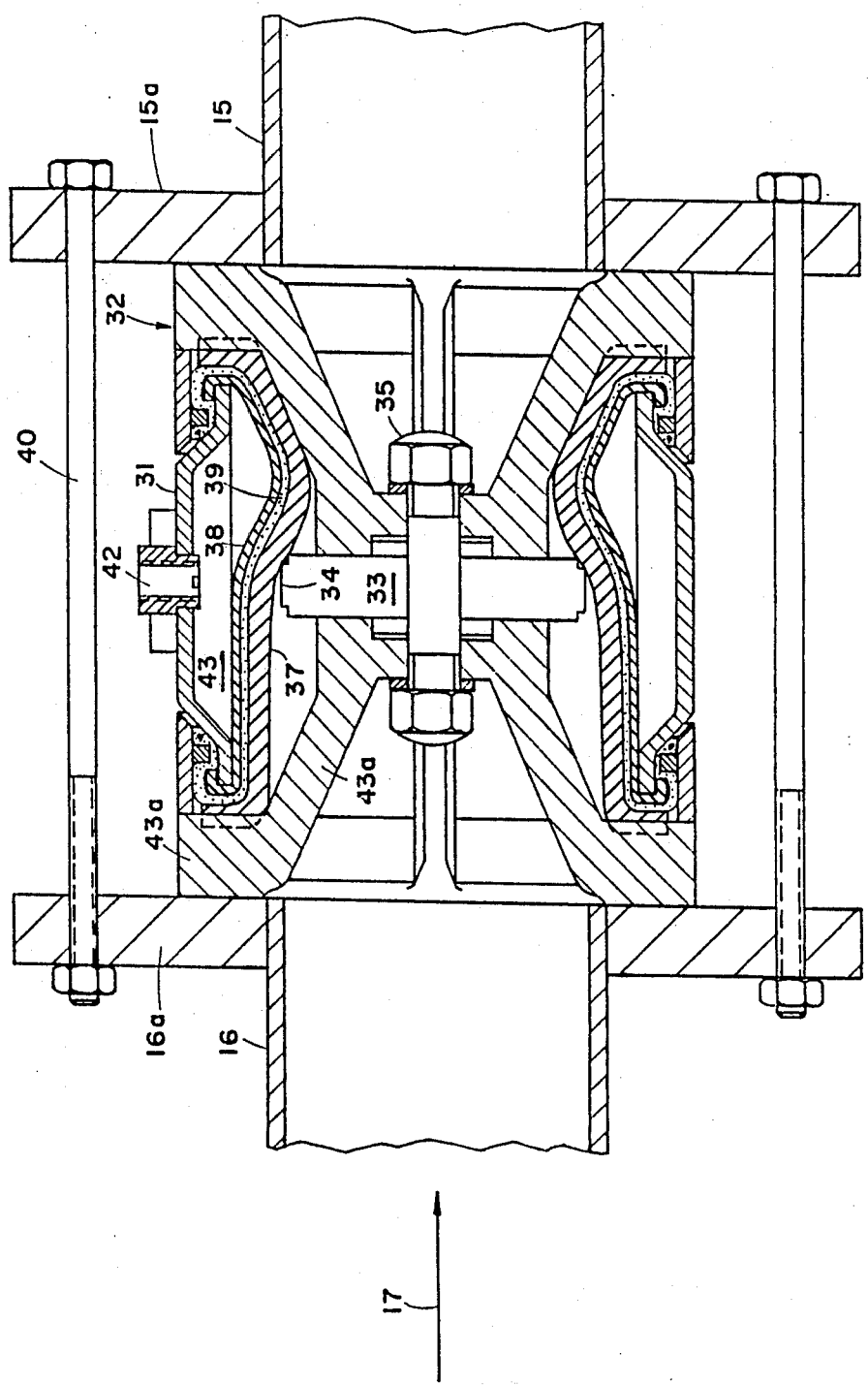

FIG. 2c, on the other hand, shows the valve in a closed state when a hydraulic pressure has been created in the control chamber 43. This figure corresponds to the operating state depicted in FIG. 1c. The three concentric layers 37, 38 and 39 now follow a single contour, because they are all subjected to the same opposing pressures. The portion of the diaphragm 36 on the upstream side of the central barrier 45 is now expanded by the upstream differential fluid flow pressure to a diameter just beyond that of the central barrier 33. In contrast, the portion of the diaphragm 36 immediately downstream of the central barrier 33 is compressed by the differential pressure to a diameter below that of the central barrier 33, pressing the inner rubber layer 37 against the periphery of the central barrier 33 and maintaining the valve in the closed state.

As is appreciated by those familiar with the type of valves to which the invention is directed, i.e. to a diaphragm or throttling type valve, for proper operation, it is important that the diaphragm be highly resilient to switch quickly between the open and closed states and thus open or close the flow path in response to the particular control pressures. A diaphragm first vulcanized to be in the open state for a normally open (NO) valve has to be resilient enough to close the valve as shown in FIG. 1c in response to the control pressure applied to the control chamber 43. On the other hand, a diaphragm, vulcanized to be in the closed state, i.e. normally closed (NC), has to be resilient enough to expand and open up as a result of the pressure of the fluid from the inlet end, enabling the fluid to flow through the valve. The higher the resiliency of the diaphragm the faster is the valve's response time. Thus, high resiliency is a sought-after property. At the same time, the diaphragm has to be sufficiently strong to withstand the various pressures, e.g. the control pressure and the upstream fluid pressure, without tearing.

In the prior art, diaphragms have been used with thick layers of rubber to provide the desired strength. See, for example, U.S. Pat. No. 3,965,925. However, in such a diaphragm the thick layers of rubber have very limited resiliency. In U.S. Pat. No. 2,633,154 a diaphragm is described in which fabric, designated therein by 23, is embedded in flexible semicircularly shaped diaphragms 2 and 3, which are joined at their lateral edges at 4 and whereat they are supported by resilient side walls 16 and 17. As stated therein, the fabric is embedded in order to minimize the stretching of these members, namely members 2, 3, 16 and 17. By embedding the fabric the stretching is indeed reduced. However, since the fabric is embedded in the rubber during the vulcanization, it also greatly reduces the resiliency of the diaphragm. Thus, the tearing problem is resolved at the price of resiliency, which is undesirable.

Unlike the prior art, in the present invention the incorporation of the cloth layer 39, which is neither bonded to nor embedded in either of the rubber layers 37 and 38, gives the diaphragm 36 both optimal resiliency and strength. Briefly, the diameter of the cylindrically shaped cloth layer 39 is chosen so that when the control fluid pressure expands the inner rubber layer 37, the cloth layer 39 is stretched to its limit and cannot stretch any more, thus limiting the extent to which the inner rubber layer 37 can expand. The circumference of the cloth layer 39 in a direction perpendicular to its length is chosen to limit the expansion of the inner rubber layer 37 to a value which is below its tearing point. Thus the latter is protected from tearing due to expansion by the cloth layer 39 which acts as a shield around it. However, since the cloth layer 39 is not embedded in the rubber layer 37, the latter's resiliency is not affected and remains high. It should be pointed out that the inner layer 37 may be prevented from over stretching by designing the diaphragm 36 so that when the valve is fully open the casing 31 acts as a shield thus preventing over-expansion. However, the casing cannot serve to provide protection for the diaphragm 36 when the valve is driven to its closed state by the control pressure. This will become clearer from the following description.

As is appreciated by those familiar with the art of valves of this type to which this invention is directed, the diaphragm 36 can sometimes become subjected to an excessive control pressure when the valve is driven to the closed state, as shown in FIGS. 1c and 2c. This is due to the fact that when the valve is closed, the downstream pressure is typically low, while the control pressure is high. Consequently, the diaphragm 36 may tend to be sucked or stretched excessively in the downstream direction. In the prior art tube-diaphragm valve of U.S. Pat. No. 4,451,023 (Zakai), a closely spaced array of fingers is employed, at least on the downstream side, to prevent the excessive stretching of the diaphragm. In the present invention such fingers are not required because any control pressure which is exerted on the outer layer 38 spreads evenly on the cloth layer 39. The latter when being fully stretched to its fixed limit, prevents any further stretching of either of the two rubber layers 37 and 38. By limited their stretching to the maximum possible by the cloth layer 39, the tearing of either rubber layer 37 or 38 is prevented without the provision of fingers as part of the support structure. It should be stressed again that the cloth layer 39 is free to expand and contract between the two rubber layers 37 and 38. It is not bonded or embedded in either of them, and thus it does not reduce their resiliency.

It should be noted that the limbs 43a of the support structure 40, while supporting the central support section 30, do not support the diaphragm 36 in the closed state so as to prevent it from stretching. Rather, as described before by way of comparison with prior art tube-diaphragm valves, the control pressure spreads evenly on the cloth layer 39. This prevents tearing of either the outer or inner rubber layers 37 or 38, thus eliminating the need for a cage-like structure having fingers as described earlier with reference to Zakai.

From the foregoing it should thus be appreciated that by providing a diaphragm made up of three concentric hollow cylinders, two of elastic resilient material and the intermediary one of mesh material, the maximum expansion of the inner and outer cylinders is effectively controlled by the intermediary mesh cylinder. Thus the resiliency of the inner and outer layers is not reduced while their maximum expansion is controlled to prevent them from tearing due to excessive stretching. These advantages are realized in a diaphragm made of three circular layers forming three concentric cylinders, each as an integral cylinder. In addition, such a diaphragm enables the utilization of a simplified support structure for the central barrier. The support structure employs a less complicated design which does not include fingers for support of the diaphragm.

The provision of the barrier 33 with a stepped peripheral rim 34 is instrumental in reducing the so-called "water hammer" effect described by Zakai in U.S. Pat. No. 4,451,023.

I claim:

1. A tube diaphragm valve for controlling hydraulic flow therethrough, said valve comprising
   valve casing means;
   inlet and outlet port means spaced apart in said casing means along a longitudinal axis of said casing means;
   an impervious stationary disc-like barrier located in a substantially median position in said casing means normal to said longitudinal axis;
   sets of radially spaced apart support limbs, a first pair of extremities of said limbs being respectively secured to opposite sides of said barrier, a second and opposite pair of extremities of said limbs being secured to said casing means, respectively adjacent said inlet and outlet port means;
   a resilient tubular diaphragm surrounding said barrier and said support limbs and extending substantially from port to port, having ends of said diaphragm secured to said casing means;
   said diaphragm having a valve closed position when abutting said barrier thereby preventing flow around said barrier and a valve open position remote from said barrier thereby enabling flow around said barrier;
   a control chamber defined by said casing means and said diaphragm;
   aperture means in said casing means to enable varying the pressure in said control chamber to move said diaphragm between said valve closed position and said valve open position;
   said diaphragm including
      innermost and outermost layers of substantially elastic resiliently distortable fluid-tight material,
      and an intermediate layer of mesh material of relatively limited stretchability, unbonded to said innermost and outermost layers and free to independently stretch to its limit without affecting the flexibility of said innermost and outermost layers,
   said innermost layer being normally stretched so as to abut said barrier and defining the limit of stretch of said intermediate layer of mesh material with lesser diameter on the downstream side of said diaphragm and said barrier than on the upstream side of said diaphragm and said barrier, when said intermediate layer of mesh material is pressed against said innermost layer in the valve closed position.

2. A tube diaphragm valve according to claim 1 wherein said second pair of extremities of said support limbs are formed integrally with annular end pieces secured to said casing means.

3. A tube diaphragm valve according to claim 2 wherein said ends of said diaphragm are clamped between said end pieces and said casing means.

4. A tube diaphragm valve according to claim 1 wherein said barrier has a stepped periphery.

* * * * *